Nov. 17, 1959   R. J. MISTARZ ET AL   2,913,068
AIR ELIMINATOR
Filed Sept. 24, 1957   2 Sheets-Sheet 2

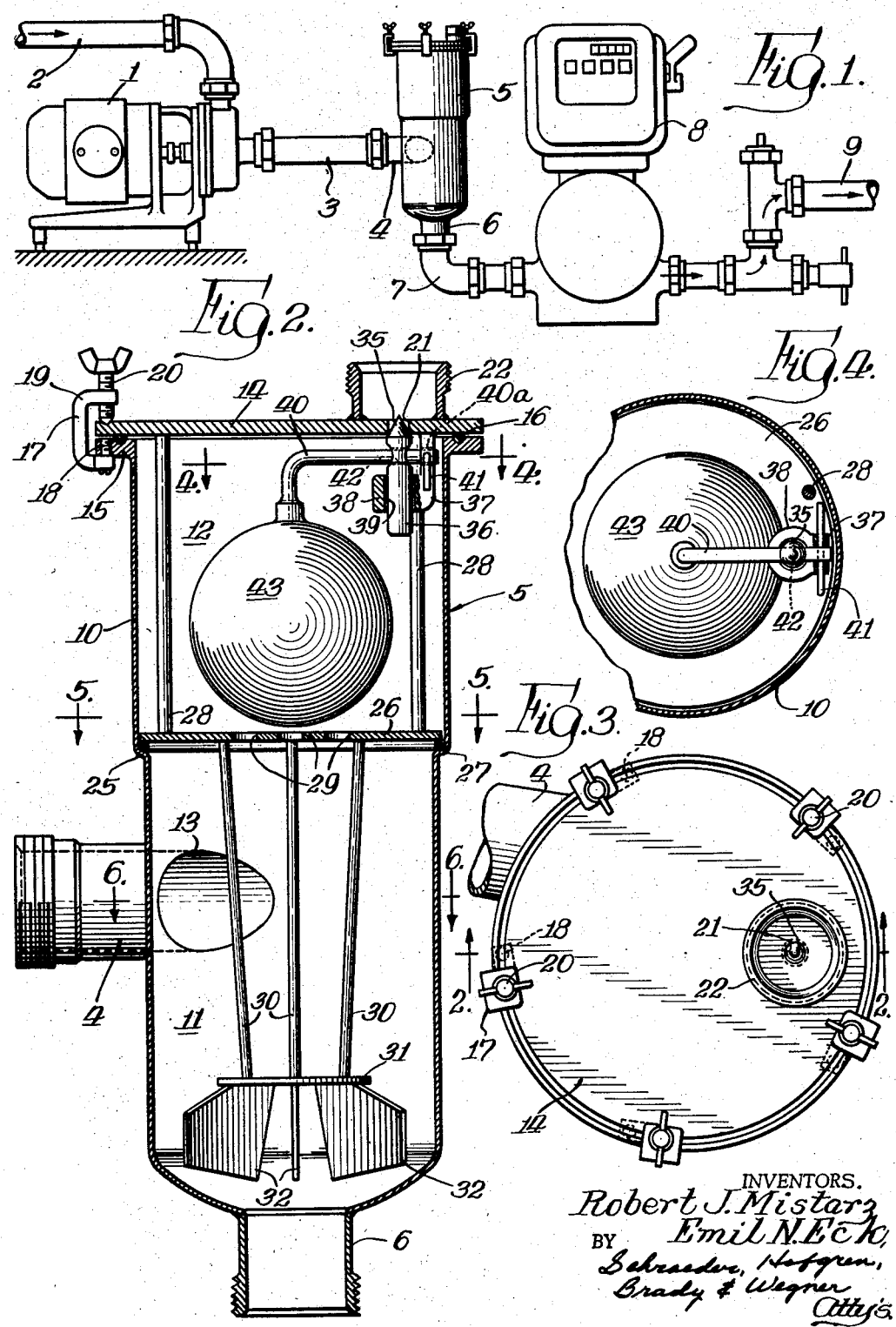

INVENTORS.
Robert J. Mistarz,
BY Emil N. Eck,
Schroeder, Hofgren,
Brady & Wagner Attys.

United States Patent Office 2,913,068
Patented Nov. 17, 1959

2,913,068

AIR ELIMINATOR

Robert J. Mistarz, Evanston, and Emil N. Eck, Chicago, Ill., assignors to Chicago Stainless Equipment Corp., a corporation of Illinois Application September 24, 1957, Serial No. 685,978

6 Claims. (Cl. 183—2.5)

This invention relates to an air eliminator and particularly to an air eliminator for use in liquid metering systems.

One of the features of this invention is to provide a new and improved air eliminator and one which is made of simply constructed and assemblable parts whereby the device may be easily taken apart for cleaning.

Other features and advantages of the invention will be apparent from the illustrative embodiment of the invention shown in the accompanying drawings. Of the drawings:

Figure 1 is a view of a liquid metering and pumping system including one embodiment of the air eliminator;

Figure 2 is a vertical section substantially along line 2—2 of Figure 3 of one embodiment of the invention;

Figure 3 is a plan view of said one embodiment of the invention;

Figure 4 is a horizontal fragmentary section along line 4—4 of Figure 2;

Figure 5:
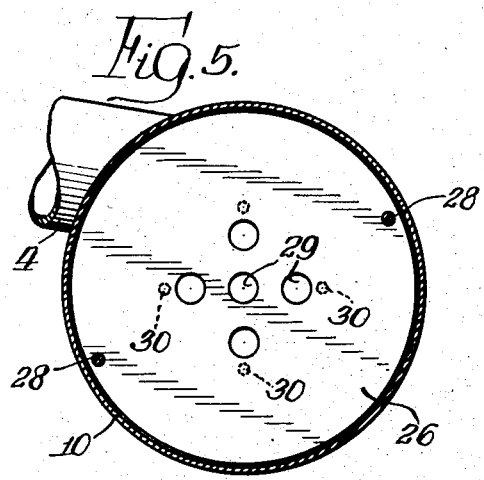
Figure 5 is a horizontal section along line 5—5 of Figure 2.
Figure 6:
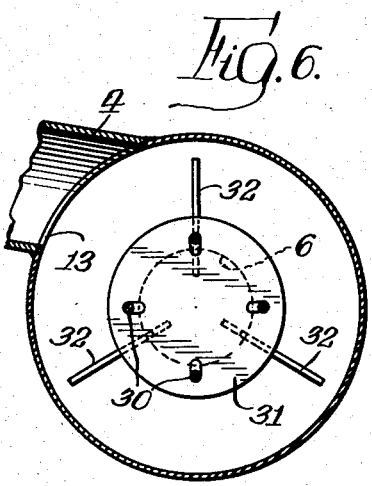
Figure 6 is a horizontal section along the line 6—6 of Figure 2.

In the flow metering system as shown in Figure 1, a positive pump 1 is connected to a supply line 2 and discharges into a line 3 fastened to an inlet connection 4 of an air eliminator 5. The supply line 2 is associated with a source of liquid such as milk and the liquid discharges into the air eliminator 5. The air eliminator 5 functions to remove air from the liquid and from the line ahead of the liquid and the liquid passes through outlet connection 6 into a line 7 leading to a flow meter 8 which measures the volume of liquid drawn from the source through supply line 2. The liquid then discharges from flow meter 8 through a line 9 leading to a storage tank or other suitable receptacles.

The air eliminator 5 in one embodiment is shown in Figures 2 to 6. The air eliminator has a generally cylindrical casing 10 with the lower portion thereof forming a vortex chamber 11 and an upper portion forming an air chamber 12. The vortex chamber 11 has the outlet connection 6 at the bottom thereof and the inlet connection 4 directed into said chamber tangentially thereto to form a generally elliptical opening 13 and cause liquid entering the chamber to form a vortex. This action results in entrained air being released from the liquid at the center of the vortex and the air being lighter rises into the air chamber 12 through perforations 29 referred to hereinafter.

The section of the casing 10 forming the upper air chamber 12 is open-ended and a cover 14 may be secured to an annular flange 15 on the casing by a sealing O-ring 16 and a plurality of swivel clamps 17 pivoted to the flange 15 by a pin 18 and having a U-shaped bracket 19 carrying a lock screw 20. The cover 14 has an air outlet 21 and a surrounding fitting 22 to which a pipe may be connected.

The casing 10 is formed with an annular internal shoulder 25 between the vortex chamber 11 and the air chamber 12 on which a centrally perforate member such as plate 26 may rest with an O-ring 27 therebetween. A pair of rods 28 upstanding from the plate 26 engage against the underside of the cover 14 when the latter is fastened to the casing to press the plate 26 on the shoulder and form a peripheral seal between the two chambers in the casing and prevent the liquid vortex rising up into air chamber 12. The plate 26 has a series of openings 29 located centrally thereof through which air and liquid may rise.

A plurality of rods 30 depend from the plate 26 and support a disc 31 overlying the outlet connection 6. The disc 31 has three radially extending breaker plates 32 secured to the underside thereof.

Liquid entering the vortex chamber 11 forms a vortex and entrained air separated from the liquid and also liquid may rise through openings 29 in the perforate plate 26. The liquid discharges through the outlet 6 and the plates 32 function to break up the vortex so that the liquid will smoothly flow from the vortex chamber 11 without carrying air therewith.

Escape of air from the air chamber 12 through the outlet 21 is controlled by a valve member 35 having a valve stem 36 slidably mounted in an L-shaped bracket fastened to the underside of the cover 14. This bracket has a leg 37 extending downwardly from the cover 14 and a valve guide portion 38 underlying the air outlet 21 and having an opening 39 slidably receiving the valve stem 36. A valve operating arm 40 at one end extends into an oversize opening 40a of the leg 37 of the L-shaped bracket and is pivoted thereon by a removable pin 41. The valve operating arm 40 extends through a transverse opening 42 in the valve stem 36 and carries at its other end a sealed float 43.

As the air chamber 12 accumulates air at its top, the liquid level therein will be forced down and at a predetermined level the lowering of the float and the valve operating arm 40 will move the valve member 35 to open the air outlet 21. Bleeding of air from the chamber will continue until the liquid level rises sufficiently to raise the float and close the air outlet 21.

All of the parts are formed of stainless steel and the air eliminator, when used with liquid foods, must be regularly cleaned. This cleaning is facilitated by the easy assembly and disassembly of the parts. With the device assembled as shown in Figure 2, release of the clamps 17 permits removal of the cover 14 and the valve mechanism supported thereon. The centrally perforate plate 26 and the mechanism connected thereto may then be withdrawn. The valve mechanism may be further disassembled by withdrawing the pin 41 so that the valve operating arm 40 may be drawn through the opening 42 in the valve stem 36. Valve stem 36 may then be withdrawn through the opening 39 in valve guide portion 38. The valve member 35 is of a diameter less than that of the opening 39 so that it may be drawn through the opening. In assembling the parts, the procedures are reversed and the valve mechanism is held in assembled relation by having the pivot pin 41 for the valve operating arm of a length to engage the wall of casing 10 which prevents the pin falling out.

Figure 7:
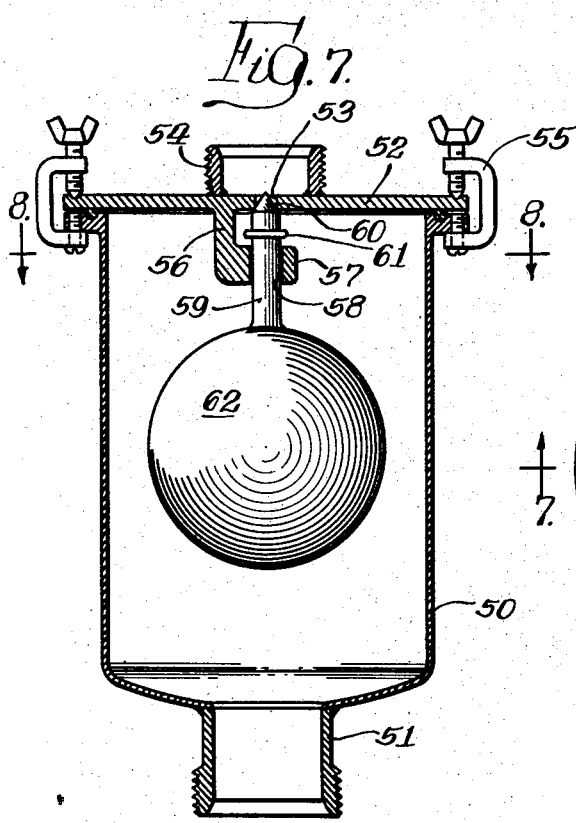
Figure 7 is a vertical section of another embodiment of the air eliminator taken along line 7—7 of Figure 8.
Figure 8:
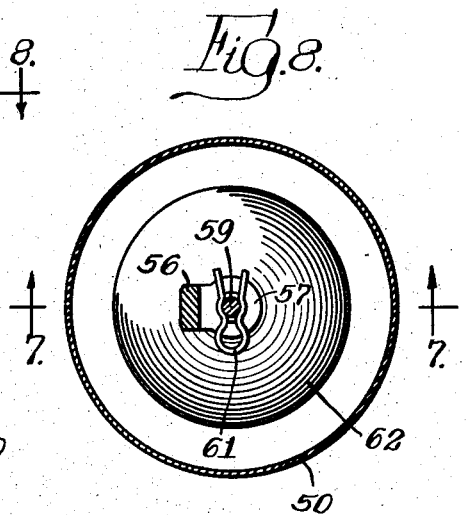
Figure 8 is a horizontal section along line 8—8 of Figure 7.

A modification of the invention is shown in Figures 7 and 8 for use with centrifugal pumps wherein a casing 50 has a fitting 51 communicating with the inside of the casing 50. The fitting 51 may be attached to a liquid conduit so that liquid and air enter the casing. A cover 52 is generally similar to cover 14 in the embodiment of Figures 2 to 6 and has an air outlet 53, a surrounding fitting 54 and clamps 55 for securing the cover 52 to the casing. An L-shaped bracket has a leg 56 depending from the cover and a valve guide portion 57 underlying the air outlet 53 and formed with an opening 58 for slidably receiving a valve stem 59. A valve member 60 may be positioned to close the air outlet 53 as shown in Figure 7 and may move downwardly to open the outlet. The downward movement of the valve member 60 is limited by a spring clip 61 fitted in a groove 62 in the valve stem and engageable with the guide portion 57. The valve stem 59 at its other end has a sealed float 62 responsive to the fluid level in the casing 50 to bleed air from the casing when the fluid level is below a predetermined level.

Having described my invention as related to the embodiments shown in the accompanying drawings, it is my intention that the invention be not limited by any of the details of description unless otherwise specified, but rather be construed broadly within its spirit and scope as set out in the accompanying claims.

We claim:

1. In a device for eliminating air from liquid, in combination: a generally cylindrical casing open at one end having adjacent vortex and air chambers with an annular internal shoulder therebetween facing said open end; said vortex chamber having a liquid inlet and a liquid outlet; a centrally perforate plate and an O-ring positioned on said shoulder to peripherally seal said chambers from each other while permitting communication therebetween; a cover for said casing open end enclosing said air chamber and having an air outlet; means mounted on said cover for venting air from said air chamber including, a valve member fitted in said air outlet and a valve operator responsive to the liquid level in said air chamber; means for releasably fastening the cover to the casing; and means in engagement with the cover for holding said plate on said shoulder, whereby the cover may be removed along with the means mounted thereon and the plate and O-ring may then be withdrawn.

2. In a device of the type defined in claim 1, plates in said vortex chamber for breaking up the liquid vortex before the liquid discharges from said chamber; and means depending from said perforate plate connecting said plates together.

3. An air eliminator comprising: a casing having a cover with an air outlet; an L-shaped bracket having a leg depending from the cover with a valve guide portion having an opening underlying the outlet, a valve of a diameter less than the opening associated with the outlet having a valve stem slidable in said valve guide opening; a valve operating arm pivoted on said leg and extending through an opening in said valve stem whereby the valve is held in assembled relation by the arm and movement of the arm slidably moves the valve; and a pin slidably mounted in said bracket leg and passing through said arm to hold the arm in assembled relation, said pin being of a length to be held in position by said casing when the cover is placed on the casing.

4. In a device for eliminating air from liquid, in combination: a casing open at an end and having adjacent vortex and air chambers with internal abutment means therebetween facing said open end; said vortex chamber having a liquid inlet and a liquid outlet; a centrally perforate plate positioned on said abutment means to partially block said chambers from each other while permitting communication therebetween; a cover for said casing open end enclosing said air chamber and having an air outlet; means mounted on said cover for venting air from said air chamber including, a valve member fitted in said air outlet and a valve operator responsive to the liquid level in said air chamber; means for releasably fastening the cover to the casing; and means in engagement with the cover for holding said plate on said shoulder, whereby the cover may be removed along with the means mounted thereon and the perforate plate may then be withdrawn.

5. An air eliminator comprising: a casing having a vortex chamber with a liquid inlet and a liquid outlet, the liquid outlet being at the bottom of the casing, and an upper air and liquid chamber above the vortex chamber; a centrally perforate member separating said chambers to block the liquid vortex from the upper chamber, while permitting communication centrally thereof; an air outlet at the top of said upper chamber; a valve member positionable to open or close said outlet; means responsive to a predetermined liquid level in said upper chamber to open said outlet and vent air; and means in said vortex chamber adjacent said liquid outlet for substantially destroying the liquid vortex before the liquid enters the outlet including a series of plates integral with said centrally perforate member to form a unit insertable in the casing.

6. An air eliminator comprising: a casing having a vortex chamber with a liquid inlet and a liquid outlet and an upper air and liquid chamber at a level above the vortex chamber; a member separating the vortex chamber and liquid chamber and containing perforations, said separating member blocking the liquid vortex from the upper chamber while permitting communication through said perforations, the separating member being located above said liquid inlet and liquid outlet; a gas outlet at the top of the upper chamber; a valve member positionable to open or close said outlet; means responsive to a predetermined liquid level in the upper chamber to open said outlet; and means in said vortex chamber adjacent said liquid outlet for substantially destroying the liquid vortex before the liquid enters the outlet, said means being integral with said separating member to form a unit insertable in and removable from the casing.

References Cited in the file of this patent

UNITED STATES PATENTS

| | | |
|---|---|---|
| 729,956 | Murray | June 2, 1903 |
| 1,775,362 | Demarcus | Sept. 9, 1930 |
| 1,856,105 | Marden | May 3, 1932 |
| 2,037,245 | Leifheit et al. | Apr. 14, 1936 |
| 2,252,687 | Bassett | Aug. 19, 1941 |
| 2,414,158 | Mock | Jan. 14, 1947 |
| 2,811,219 | Wenzl | Oct. 29, 1957 |